US012783032B2

(12) United States Patent
Ono

(10) Patent No.: US 12,783,032 B2
(45) Date of Patent: Nov. 3, 2026

(54) HOST DEVICE, SLAVE DEVICE, AND HOST-SLAVE SYSTEM

(71) Applicant: Panasonic Intellectual Property Management Co., Ltd., Osaka (JP)

(72) Inventor: Tadashi Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 18/795,811

(22) Filed: Aug. 6, 2024

(65) Prior Publication Data

US 2024/0393854 A1 Nov. 28, 2024

Related U.S. Application Data

(63) Continuation of application No. PCT/JP2023/002134, filed on Jan. 24, 2023.

(30) Foreign Application Priority Data

Feb. 22, 2022 (JP) ................................ 2022-025198

(51) Int. Cl.
*G06F 1/00* (2006.01)
*G06F 1/26* (2006.01)

(52) U.S. Cl.
CPC .................................... *G06F 1/266* (2013.01)

(58) Field of Classification Search
CPC ....................................................... G06F 1/266
See application file for complete search history.

(56) References Cited

U.S. PATENT DOCUMENTS 10,429,916 B2 * 10/2019 Yoshihara ............. G06F 1/3237
2003/0098736 A1 * 5/2003 Uchikoba .............. H02M 3/07 327/534
2003/0172312 A1 * 9/2003 Takahashi .............. G06F 1/266 713/300

(Continued)

FOREIGN PATENT DOCUMENTS

JP 2003-263245 9/2003
JP 2011-182020 9/2011

(Continued)

OTHER PUBLICATIONS

International Search Report issued Mar. 20, 2023 in International (PCT) Application No. PCT/JP2023/002134.

*Primary Examiner* — Mohammed H Rehman
(74) *Attorney, Agent, or Firm* — Wenderoth, Lind & Ponack, L.L.P.

(57) ABSTRACT

The host device supplies power with a first voltage to the slave device through the first power supply line, instructs the slave device through the signal line to check compatibility with a power input with a second voltage lower than the first voltage, and instructs the slave device on voltage switch through the signal line when the slave device is compatible with the power input with the second voltage. When receiving a normal response from the slave device to the instruction for the voltage switch, the host device supplies the power with the second voltage to the slave device through the second power supply line, and stops supplying the power with the first voltage to the slave device through the first power supply line.

12 Claims, 12 Drawing Sheets

(56) References Cited

U.S. PATENT DOCUMENTS

| | | | | |
|---|---|---|---|---|
| 2006/0171329 | A1* | 8/2006 | Ying | H02J 13/1321 370/254 |
| 2010/0250988 | A1* | 9/2010 | Okuda | G09G 5/006 713/323 |
| 2010/0264753 | A1* | 10/2010 | Toyama | G06F 1/26 307/130 |
| 2012/0032528 | A1 | 2/2012 | Toyama et al. | |
| 2012/0033717 | A1 | 2/2012 | Toyama et al. | |
| 2013/0232372 | A1* | 9/2013 | Sakamaki | G11C 5/04 713/500 |
| 2017/0123473 | A1 | 5/2017 | Yoshihara | |
| 2020/0393891 | A1* | 12/2020 | Baggett | G06F 1/3234 |
| 2022/0113787 | A1* | 4/2022 | Tsai | G06F 1/26 |
| 2023/0179076 | A1* | 6/2023 | Yang | H02M 1/008 |

FOREIGN PATENT DOCUMENTS

| | | |
|---|---|---|
| JP | 2017-84305 | 5/2017 |
| WO | 2009/107400 | 9/2009 |

* cited by examiner (a)

(b)

| TERMINAL NUMBER | TERMINAL NAME |
|---|---|
| 1 | DAT3 |
| 2 | CMD |
| 3 | VSS1 |
| 4 | VDD1(=3.3V) |
| 5 | CLK |
| 6 | VSS2 |
| 7 | DAT0 |
| 8 | DAT1 |
| 9 | DAT2 |
| 14 | VDD2(=1.8V) |

(a)

(b)

| TERMINAL NUMBER | TERMINAL NAME |
|---|---|
| 1 | DAT2 |
| 2 | DAT3 |
| 3 | CMD |
| 4 | VDD1(=3.3V) |
| 5 | CLK |
| 6 | VSS |
| 7 | DAT0 |
| 8 | DAT1 |
| 9 | VDD2(=1.8V) |

(a)

(b)

| TERMINAL # | TERMINAL NAME |
|---|---|
| 1 | DAT3 |
| 2 | CMD |
| 3 | VSS1 |
| 4 | VDD1(=3.3V) |
| 5 | CLK |
| 6 | VSS2 |
| 7 | DAT0 |
| 8 | DAT1 |
| 9 | DAT2 |
| 18 | VDD3(=1.2V) |

(a)

(b)

| TERMINAL # | TERMINAL NAME |
|---|---|
| 1 | DAT2 |
| 2 | DAT3 |
| 3 | CMD |
| 4 | VDD1(=3.3V) |
| 5 | CLK |
| 6 | VSS |
| 7 | DAT0 |
| 8 | DAT1 |
| 17 | VDD3(=1.2V) |

(a) (b) (c) (d)

(e)

| TERMINAL NUMBER | TERMINAL NAME | (a) | (b) | (c) | (d) |
|---|---|---|---|---|---|
| 1 | DAT3 | ○ | ○ | ○ | ○ |
| 2 | CMD | ○ | ○ | ○ | ○ |
| 3 | VSS1 | ○ | ○ | ○ | ○ |
| 4 | VDD1(=3.3V) | ○ | ○ | ○ | ○ |
| 5 | CLK | ○ | ○ | ○ | ○ |
| 6 | VSS2 | ○ | ○ | ○ | ○ |
| 7 | DAT0 | ○ | ○ | ○ | ○ |
| 8 | DAT1 | ○ | ○ | ○ | ○ |
| 9 | DAT2 | ○ | ○ | ○ | ○ |
| [10,13,17] | [VSS] | ○ | — | — | — |
| [11,12,15,16] | [PCIe SIGNAL] | ○ | — | — | — |
| 14 | VDD2(=1.8V) | ○ | ○ | — | ○ |
| 18 | VDD3(=1.2V) | ○ | — | ○ | ○ |

○: COMPATIBLE
—: NOT COMPATIBLE
[ ]: SD Express CARD USED ONLY (a)

(e)

| TERMINAL NUMBER | TERMINAL NAME | (a) | (b) | (c) | (d) |
|---|---|---|---|---|---|
| 1 | DAT2 | ○ | ○ | ○ | ○ |
| 2 | DAT3 | ○ | ○ | ○ | ○ |
| 3 | CMD | ○ | ○ | ○ | ○ |
| 4 | VDD1(=3.3V) | ○ | ○ | ○ | ○ |
| 5 | CLK | ○ | ○ | ○ | ○ |
| 6 | VSS | ○ | ○ | ○ | ○ |
| 7 | DAT0 | ○ | ○ | ○ | ○ |
| 8 | DAT1 | ○ | ○ | ○ | ○ |
| 9 | VDD2(=1.8V) | ○ | ○ | — | ○ |
| [10,13,16] | [VSS] | ○ | — | — | — |
| [11,12,14,15] | [PCIe SIGNAL] | ○ | — | — | — |
| 17 | VDD3(=1.2V) | ○ | — | ○ | ○ |

○: COMPATIBLE
—: NOT COMPATIBLE
[ ]: SD Express CARD USED ONLY (a)

HOST DEVICE, SLAVE DEVICE, AND HOST-SLAVE SYSTEM

TECHNICAL FIELD

The present disclosure relates to a host device, a slave device, and a host-slave system formed by these devices.

BACKGROUND ART

In recent years, a slave device such as an insertable and removable storage medium including an SD card (registered trademark), a flash memory, and the like as a back-end module has become widespread. The SD card as the slave device is connected to a host device such as a personal computer or a camera, and can access data to the back-end module while receiving power supply from the host device.

PTL 1 discloses a technique for converting a signal voltage for performing data communication between a host device and a slave device after the host device activates the slave device.

PTL 2 discloses a technique for reducing an influence of a clock signal on an internal power supply voltage when a memory module is shifted to a low power consumption mode.

CITATION LIST

Patent Literature

PTL 1: International Publication No. WO 2009/107400

PTL 2: Unexamined Japanese Patent Publication No. 2017-084305

SUMMARY OF THE INVENTION

When the host device activates the SD card as the slave device to perform operations such as reading and writing of data, the host device needs to supply a power supply of 3.3 V to the SD card. The power supply of 3.3 V is required for a controller inside the SD card to control data transmission and reception with the flash memory and the host device, and data access to the flash memory.

An input power supply voltage of 3.3 V has been mainly used for a semiconductor chip such as a controller or a flash memory. However, semiconductor chips compatible with a lower input power supply voltage such as 1.8 V than before have been widely used in recent years. When this kind of semiconductor chip is mounted on a conventional SD card, a power 3.3 V received by the SD card needs to be stepped down to 1.8 V by a regulator to supply the reduced voltage to the semiconductor chip.

When a consumption current of the flash memory generated during data reading and writing is assumed as 0.2 A in such a configuration, for example, a power loss calculated by "(3.3 V−1.8V)×0.2 A=0.3 W" occurs due to step-down processing using the regulator. This power loss is not preferable in a mobile device, an IoT device, or the like that is a host device in which the total amount of power that can be supplied is not large.

The present disclosure provides a host device, a slave device, and a host-slave system capable of reducing power consumption in a steady state while maintaining compatibility with a conventional SD card.

The host device in the present disclosure is connected to a slave device through at least a first power supply line, a second power supply line, and a plurality of signal lines. The host device supplies power with a first voltage to the slave device through the first power supply line, instructs the slave device through the signal line to check compatibility with a power input with a second voltage lower than the first voltage, and instructs the slave device on voltage switch through the signal line when the slave device is compatible with the power input with the second voltage. When receiving a normal response from the slave device to the instruction for the voltage switch, the host device supplies the power with the second voltage to the slave device through the second power supply line, and stops supplying the power with the first voltage to the slave device through the first power supply line.

The slave device in the present disclosure is connected to the host device through at least the first power supply line, the second power supply line, and the plurality of signal lines. The slave device receives supply of power having a first voltage from the host device through the first power supply line, responds to the host device through the signal line when receiving an instruction to check compatibility with a power input with the second voltage lower than the first voltage from the host device through the signal line, and transmits a normal response to the host device through the signal line when receiving an instruction for voltage switch from the host device through the signal line.

The host-slave system according to the present disclosure includes a host device and a slave device connected to the host device through at least a first power supply line, a second power supply line, and a plurality of signal lines. The host device supplies power with a first voltage to the slave device through the first power supply line, and instructs the slave device to check compatibility with the power input with a second voltage lower than the first voltage through the signal line. The slave device responds to the host device through the signal line when receiving an instruction to check compatibility with the power input with the second voltage. When the slave device is compatible with the power input with the second voltage, the host device instructs the slave device on voltage switch through the signal line. The slave device transmits a normal response to the host device through the signal line when being instructed on voltage switch from the host device through the signal line. When receiving a normal response from the slave device, the host device supplies the power with the second voltage to the slave device through the second power supply line, and stops supplying the power with the first voltage through the first power supply line.

The present disclosure enables reducing power consumption of the insertable and removable slave device including the SD card.

DESCRIPTION OF EMBODIMENT

Figure 1:
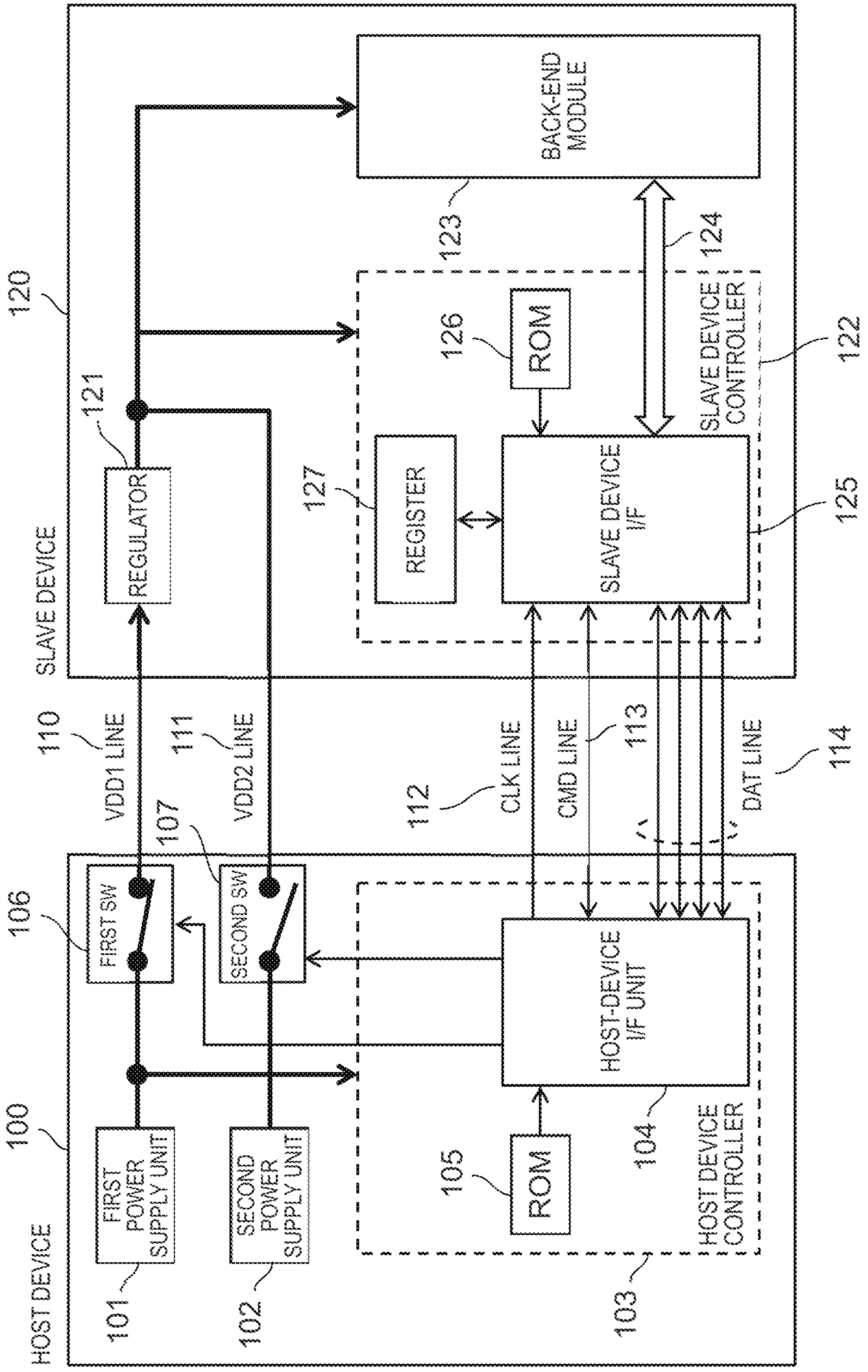
FIG. 1 is a block diagram illustrating a configuration of a host-slave system including a slave device and a host device according to a first exemplary embodiment.

Hereinafter, exemplary embodiments will be described in detail with appropriate reference to the drawings. Descriptions more in detail than necessary may not be described. For example, detailed descriptions of already well-known matters and duplicated description of substantially identical configurations may not be described. This is to avoid the explanations below from being unnecessarily redundant, and to facilitate understanding of the explanations by those skilled in the art. Components denoted by the same reference numerals have the same functions in each exemplary embodiment.

The inventors provide the attached drawings and the following description for those skilled in the art to fully understand the present disclosure, and does not intend that the attached drawings and the following description limit the subject matter described in the scope of claims.

First Exemplary Embodiment

FIG. 1 is a block diagram illustrating a host-slave system including a slave device and a host device that controls the slave device, according to a first exemplary embodiment.

A signal being at a low level in the present description means that the signal has a voltage of 0 V or near 0 V. A signal being at a high level means that the signal has a voltage higher than that at a low level and can easily be distinguished from the signal at the low-level. In the present exemplary embodiment, a voltage value representing the high level is set to 3.3 V or 1.8 V.

As illustrated in FIG. 1, host device 100 includes first power supply unit 101 that supplies at least a power supply of 3.3 V, second power supply unit 102 that supplies a power supply of 1.8 V, host device controller 103, first SW 106 that switches whether to output power supplied from first power supply unit 101 to the outside, and second SW 107 that switches whether to output power supplied from second power supply unit 102 to the outside. Host device controller 103 includes at least host device I/F unit 104 and ROM 105 that is a read-only memory. An example of host device I/F unit 104 is a processor that executes a program stored in ROM 105.

Host device 100 and slave device 120 are mechanically connected. Host device 100 is also electrically connected to slave device 120 through VDD1 line 110 (an example of a first power supply line) that is a 3.3 V power supply line, VDD2 line 111 (an example of a second power supply line) that is a 1.8 V power supply line, and signal lines to be described later. Host device 100 may be further connected to slave device 120 through a VDD line (not illustrated) that is a 1.2 V power line as described in a second exemplary embodiment. That is, host device 100 may be connected to the slave device through three or more power supply lines (power supply wires).

Slave device 120 includes regulator 121 that steps down at least a power supply of 3.3 V to a power supply of 1.8 V, slave device controller 122, back-end module 123, and back-end bus 124 that performs data communication between slave device controller 122 and back-end module 123.

Slave device controller 122 includes at least slave device I/F unit 125, ROM 126, and register 127. Slave device controller 122 in the present disclosure controls each element in slave device 120. An example of slave device I/F unit 125 is a processor that executes a program stored in ROM 126.

Examples of back-end module 123 in the present disclosure include a flash memory that stores data transmitted from host device 100.

Host device I/F unit 104 and slave device I/F unit 125 perform signal communication through CLK line 112, CMD line 113, and DAT line 114. Although DAT line 114 includes four signal lines, the number of signal lines is not limited to four. CLK line 112, CMD line 113, and DAT line 114 are collectively referred to as signal lines. Host device I/F unit 104 and slave device I/F unit 125 can also communicate with each other through at least one signal line (e.g., CMD line 113) of the plurality of signal lines (CLK line 112, CMD line 113, DAT line 114).

Figure 2:
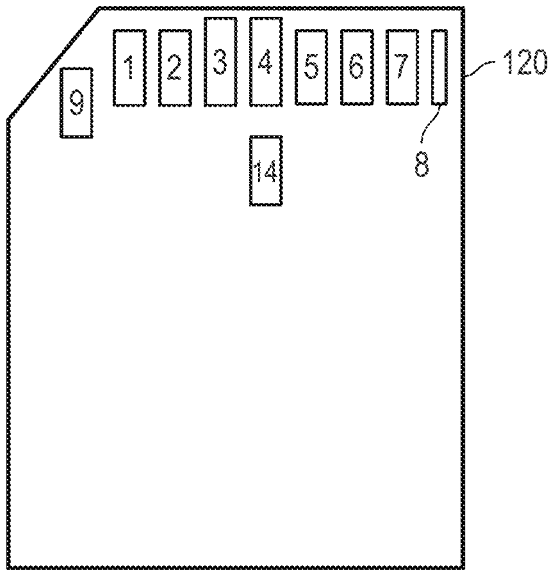
FIG. 2 is a diagram illustrating terminal placement of an SD card that is an example of the slave device according to the first exemplary embodiment.

FIG. 2 is a diagram illustrating terminal placement and terminal names of an SD card that is an example of the slave device according to the first exemplary embodiment. The SD card illustrated in FIG. 2(*a*) includes nine terminals with terminal numbers 1 to 9 in an upper part of the drawing, and one terminal with terminal number 14 below the nine terminals, thereby totaling to ten terminals. Each terminal has a terminal name as illustrated in FIG. 2(*b*), and is connected to a power supply or a signal line corresponding to the terminal name. Here, VSS1 and VSS2 each indicate a ground terminal.

Although the conventional SD card includes only the terminals with terminal numbers 1 to 9, the SD card according to the present exemplary embodiment includes a terminal for VDD1 (terminal number 14) that is a 1.8 V power line in addition to the nine terminals described above.

Figure 3:
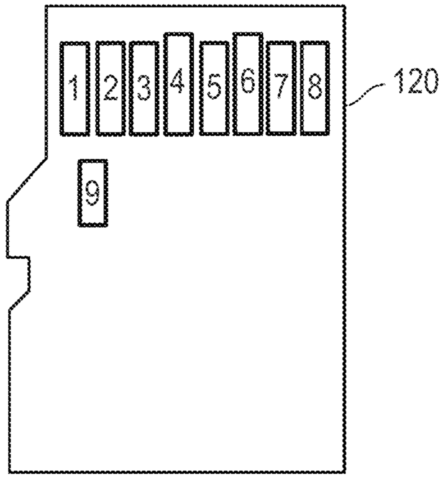
FIG. 3 is a diagram illustrating terminal placement of a microSD card that is an example of the slave device according to the first exemplary embodiment.

FIG. 3 is a diagram for describing terminal placement and terminal names of a microSD card that is another example of the slave device according to the first exemplary embodiment. The microSD has a surface area and a thickness smaller than those of the SD card, and has a communication protocol with host device 100, which is common to that of the SD card. The microSD card illustrated in FIG. 3(*a*) includes eight terminals with terminal numbers 1 to 8 in the upper part of the drawing, and one terminal of terminal number 9 below the eight terminals, thereby totaling to nine terminals. Each terminal has a terminal name as illustrated in FIG. 3(*b*).

Although a conventional microSD card includes only terminals with terminal numbers 1 to 8, the microSD card according to the present exemplary embodiment includes a terminal for VDD1 (terminal number 9) that is a 1.8 V power line in addition to the eight terminals described above.

Figure 4:
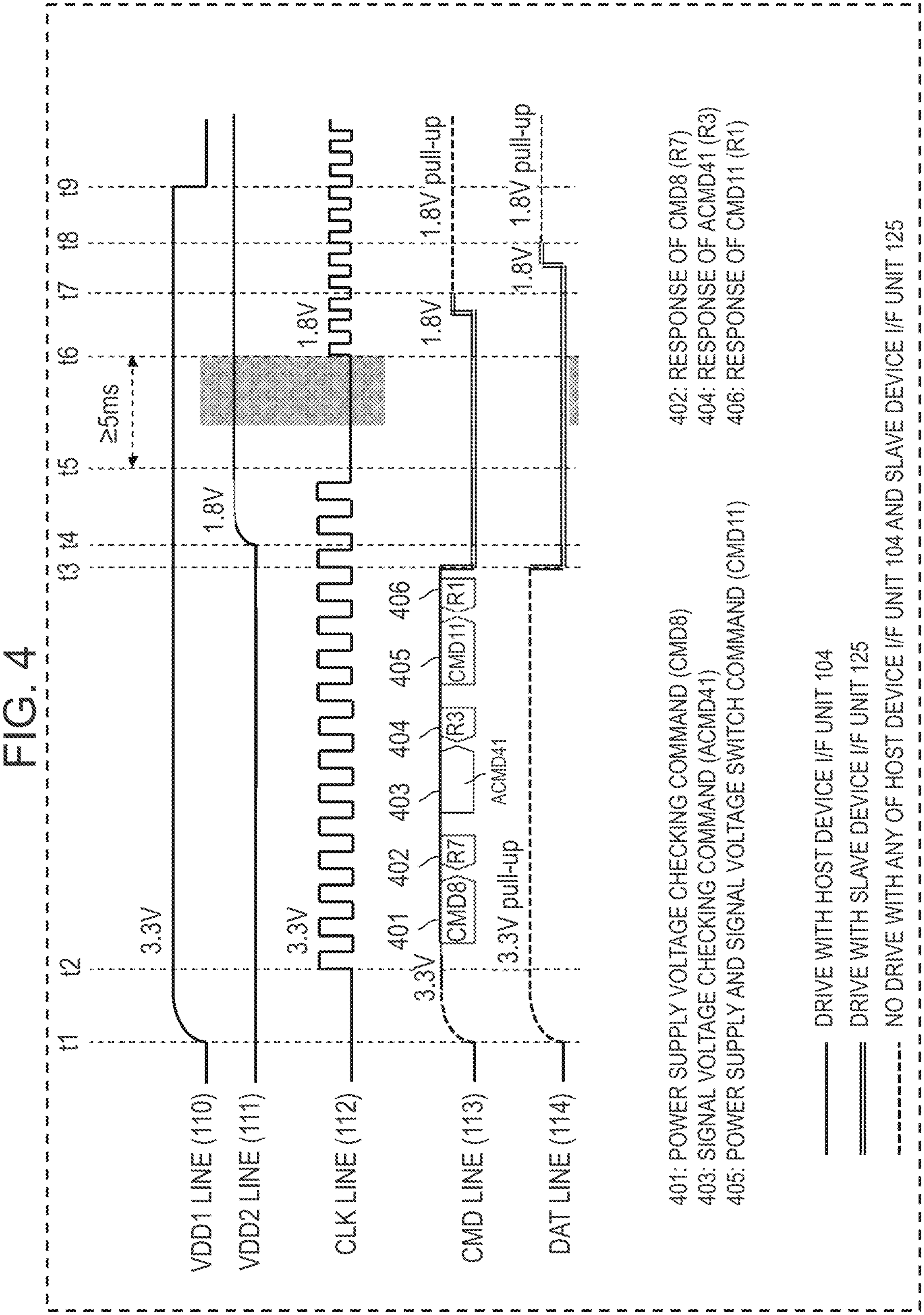
FIG. 4 is a timing chart illustrating an activation sequence of the host-slave system according to the first exemplary embodiment.
Figure 5:
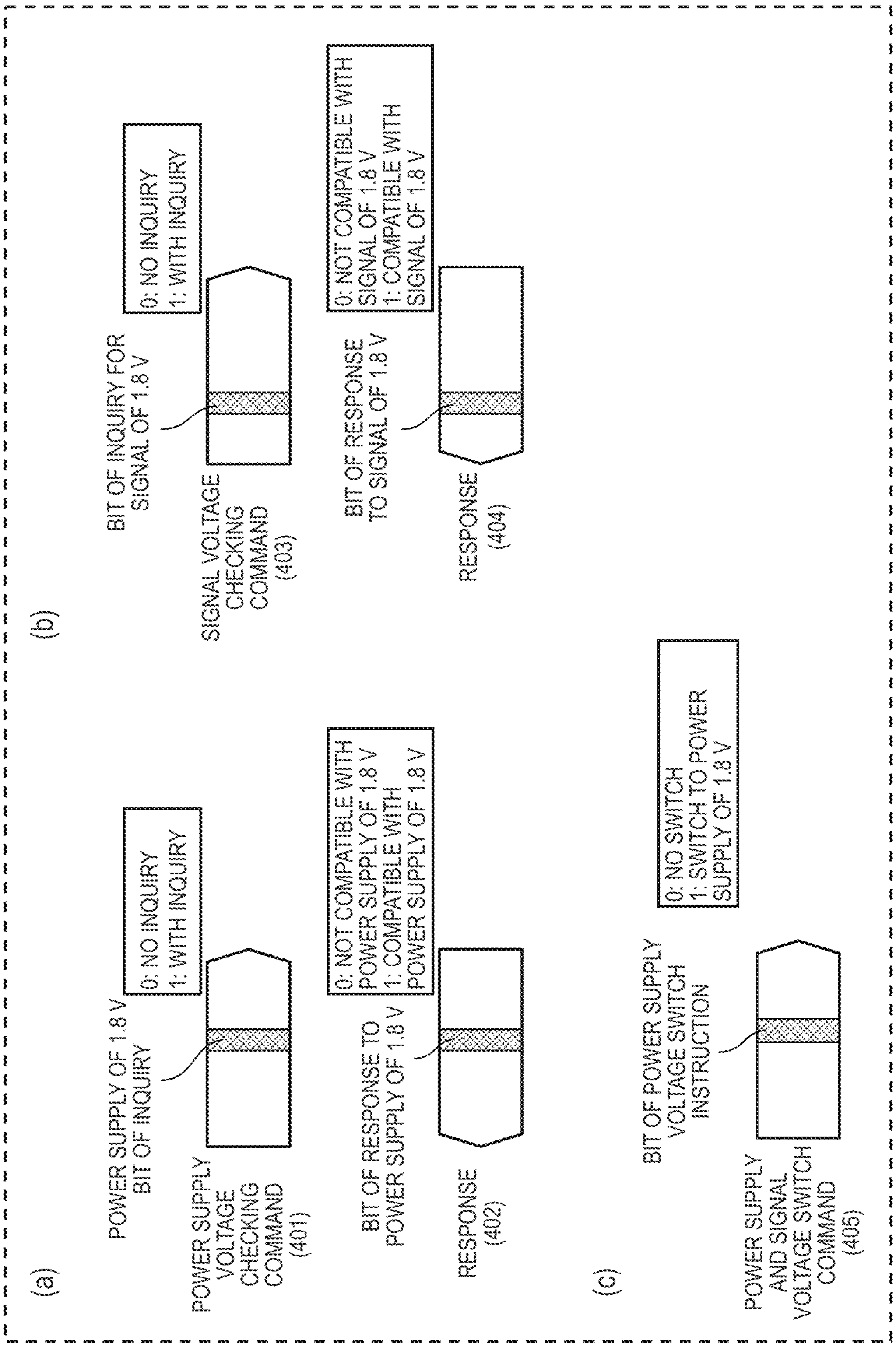
FIG. 5 is a diagram illustrating a power supply voltage checking command, a signal voltage checking command, a power supply and signal voltage switch command, and parameters incorporated in corresponding responses in the first exemplary embodiment.
Figure 6:
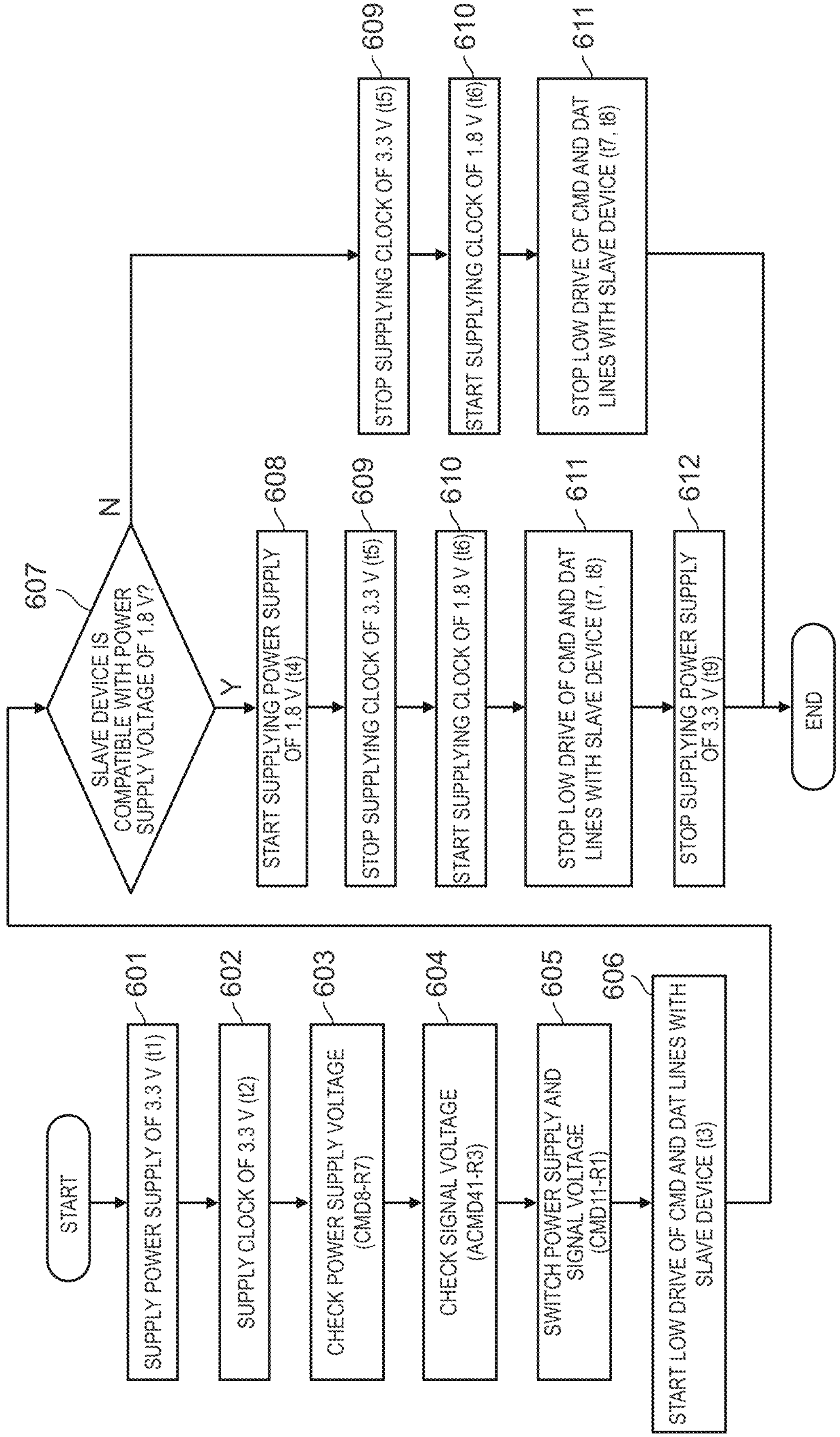
FIG. 6 is a flowchart of the activation sequence of the host-slave system according to the first exemplary embodiment.

FIG. 4 is a timing chart illustrating an activation sequence according to the first exemplary embodiment, FIG. 5 is a diagram illustrating configurations of a power supply voltage checking command and a response thereof, a signal voltage checking command and a response thereof, and a power supply and signal voltage switch command in the activation sequence of FIG. 4, and FIG. 6 is a flowchart according to the first exemplary embodiment.

Hereinafter, operation of the host-slave system according to the present exemplary embodiment will be described with reference to FIGS. 1 to 6.

When host device 100 is activated, first power supply unit 101 and second power supply unit 102 are first activated. Then, a power supply of 3.3 V is supplied from first power supply unit 101 to host device controller 103. The power supplied to host device controller 103 may be a power supply of 1.8 V supplied from second power supply unit 102, or both the power supply of 3.3 V and the power supply of 1.8 V. Then, a program for activating host device I/F unit 104 is loaded from ROM 105 in host device controller 103.

First SW 106 and second SW 107 are turned off immediately after host device 100 is activated, so that the power supply of 3.3 V supplied by first power supply unit 101 and the power supply of 1.8 V supplied by second power supply unit 102 are not output to the outside of host device 100.

After completion of activation of host device 100, host device I/F unit 104 instructs first SW 106 to be turned on. As a result, the power supply of 3.3 V is supplied to slave device 120 through VDD1 line 110 at time t1 in FIG. 4. That is, host device 100 supplies power with a voltage of 3.3 V to slave device 120 through VDD1 line 110. As the power supply of 3.3 V rises, CMD line 113 and DAT line 114 transition from a low level to a high level of 3.3 V using a pull-up resistor (not illustrated) (601).

Slave device 120 receives supply of the power supply of 3.3 V from the terminal with terminal number 4 in FIG. 2 when the SD card is used, and from the terminal with terminal number 4 in FIG. 3 when the microSD card is used. The power supply of 3.3 V supplied to slave device 120 is stepped down to the power supply of 1.8 V by regulator 121 and supplied to slave device controller 122 and back-end module 123. In slave device controller 122, a program for activating slave device I/F unit 125 is loaded from ROM 126, and register 127 is activated.

After supply of the power supply of 3.3 V to slave device 120 from host device 100 is stabilized, host device I/F unit 104 supplies a clock of 3.3 V to slave device I/F unit 125 through CLK line 112 at time t2 (602).

Subsequently, host device I/F unit 104 transmits power supply voltage checking command 401 (CMD8) to slave device I/F unit 125 through CMD line 113. As illustrated in FIG. 5(*a*), a bit of inquiry for the power supply of 1.8 V is multiplexed in power supply voltage checking command 401. That is, host device 100 instructs the slave device 120 to check compatibility with input of the power supply of 1.8 V. In the present exemplary embodiment, "1 (an example of a predetermined value)" (with inquiry) is set to the bit of inquiry for the power supply of 1.8 V.

When "1" is set to the bit of inquiry for the power supply of 1.8 V, slave device I/F unit 125 having received power supply voltage checking command 401 calls a bit "1" indicating compatibility with the power supply of 1.8 V from register 127, and sets the bit to a bit of response to the power supply of 1.8 V of response 402 (R7) illustrated in FIG. 5(*a*). Slave device I/F unit 125 then transmits response 402 to host device I/F unit 104 through CMD line 113 (603).

When slave device 120 is not compatible with the power supply of 1.8 V, "0" is always set to the bit of response to the power supply of 1.8 V of response 402 regardless of a value of the bit of inquiry for the power supply of 1.8 V of power supply voltage checking command 401. When the value of the bit of inquiry for the power supply of 1.8 V of power supply voltage checking command 401 is "0", "0 (an example of a predetermined value)" is always set to the bit of response to the power supply of 1.8 V of response 402 regardless of compatibility of slave device 120 with the power supply of 1.8 V.

After receiving response 402, host device I/F unit 104 transmits signal voltage checking command 403 (ACMD41) to slave device I/F unit 125 through CMD line 113. The ACMD is an abbreviation of Application CMD. As illustrated in FIG. 5(*b*), the bit of inquiry for the signal of 1.8 V are multiplexed in signal voltage checking command 403. In the present exemplary embodiment, "1" (with inquiry) is set to the bit of inquiry for the signal of 1.8 V.

When "1" is set to the bit of inquiry for the signal of 1.8 V, slave device I/F unit 125 having received signal voltage checking command 403 calls a bit "1" indicating compatibility with a signal of 1.8 V from register 127, and sets the bit "1" to the bit of response to the signal of 1.8 V of response 404 (R3) illustrated in FIG. 5(*b*). Slave device I/F unit 125 then transmits response 404 to host device I/F unit 104 through CMD line 113 (604).

Similar to the power supply of 1.8 V, when slave device 120 is not compatible with the signal of 1.8 V, "0" is always set to the bit of response to the signal of 1.8 V of response 404 regardless of a value of a bit of inquiry for the signal of 1.8 V of signal voltage checking command 403. When the value of the bit of inquiry for the signal of 1.8 V of signal voltage checking command 403 is "0", "0" is always set to the bit of response to the signal 1.8 V of response 404 regardless of compatibility of slave device 120 with the signal of 1.8 V.

After the series of checking operations, host device I/F unit 104 transmits power supply and signal voltage switch checking command 405 (CMD11) to slave device I/F unit 125 through CMD line 113. A bit of power supply voltage switch instruction is multiplexed in the power supply and signal voltage switch checking command 405 in the present exemplary embodiment, and "1 (an example of a predetermined value)" (switch to the power supply of 1.8 V) is set to the bit.

Slave device I/F unit 125 having received power supply and signal voltage switch checking command 405 transmits response 406 (R1) to host device I/F unit 104 through CMD line 113 (605). That is, slave device 120 transmits a normal response to host device 100 through CMD line 113.

Subsequently, slave device I/F unit 125 drives all signal lines of CMD line 113 and DAT line 114 to the low level at time t3 (606). When slave device 120 being not compatible with the power supply of 1.8 V receives power supply and signal voltage switch checking command 405 in which "1"

is multiplexed into the bit of power supply voltage switch instruction, slave device 120 does not transmit response 406 (R1) and does not drive CMD line 113 and DAT line 114 to the low level. As a result, host device 100 detects that switch to the power supply of 1.8 V is impossible.

When host device I/F unit 104 detects that the slave device compatible with the power supply of 1.8 V (Y in 607), i.e., when the value of the bit of response to the power supply of 1.8 V of response 402 is "1" and response 406 is received, host device I/F unit detects that all signal lines of CMD line 113 and DAT line 114 are at the low level, and then turns on second SW 107 at time t4 to supply the power supply of 1.8 V to slave device 120 through VDD2 line 111 (608). That is, host device 100 supplies power with 1.8 V to slave device 120 through VDD2 line 111. At this time, slave device 120 receives supply of the power supply of 1.8 V from the terminal with terminal number 14 in FIG. 2 when the SD card is used, and from the terminal with terminal number 9 in FIG. 3 when the microSD card is used.

After supply of the power supply of 1.8 V to slave device 120 from host device 100 is stabilized, host device I/F unit 104 stops the supply of the clock of 3.3 V at time t5 (609). Then, at time t6 when a predetermined time or more has elapsed from time t5, host device I/F unit 104 starts supplying a clock of 1.8 V through CLK line 112 (610).

During a period from time t5 to time t6, host device I/F unit 104 and slave device I/F unit 125 perform processing necessary for switching a signal voltage of each signal line from 3.3 V to 1.8 V. Although the time from time t5 to time t6 is set to 5 ms or more in the present exemplary embodiment, another numerical value of the time may be used.

When slave device I/F unit 125 detects the clock of 1.8 V on CLK line 112 after time t6, CMD line 113 is first driven to a high level of 1.8 V, and then driving of CMD line 113 is stopped at time t7. As a result, CMD line 113 is maintained at the high level of 1.8 V using the pull-up resistor. Subsequently, slave device I/F unit 125 drives DAT line 114 to the high level of 1.8 V, and then stops driving of all signal lines of DAT line 114 at time t8. As a result, DAT line 114 is maintained at the high level of 1.8 V using the pull-up resistor (611).

When host device I/F unit 104 detects that CMD line 113 and DAT line 114 are each at the high level, first SW 106 is turned off at time t9 to stop supplying the power supply of 3.3 V through VDD1 line 110 (612). After that, slave device 120 is driven only by the power supply of 1.8 V supplied through VDD2 line 111, and regulator 121 does not operate.

When host device I/F unit detects that the slave device is not compatible with the power supply of 1.8 V (N in 607), i.e., when the value of the bit of response to the power supply of 1.8 V of response 402 is "0", host device I/F unit 104 does not start supplying the power supply of 1.8 V (608) and stop supplying the power supply of 3.3 V (612), and drives slave device 120 by stopping supplying the clock of 3.3 V (609), staring supplying the clock of 1.8 V (610), and stopping low driving of CMD and DAT lines (611) using the slave device, while supplying the power supply of 3.3 V.

As described above, the present exemplary embodiment enables eliminating power loss that has been conventionally generated in regulator 121 during reading and writing of data from and to back-end module 123 through back-end bus 124 after switch of the power supply and the signal voltage. In combination with the signal voltage being lowered from 3.3 V to 1.8 V, reduction in power consumption is achieved in the host-slave system according to the present exemplary embodiment.

Second Exemplary Embodiment

Figure 7:
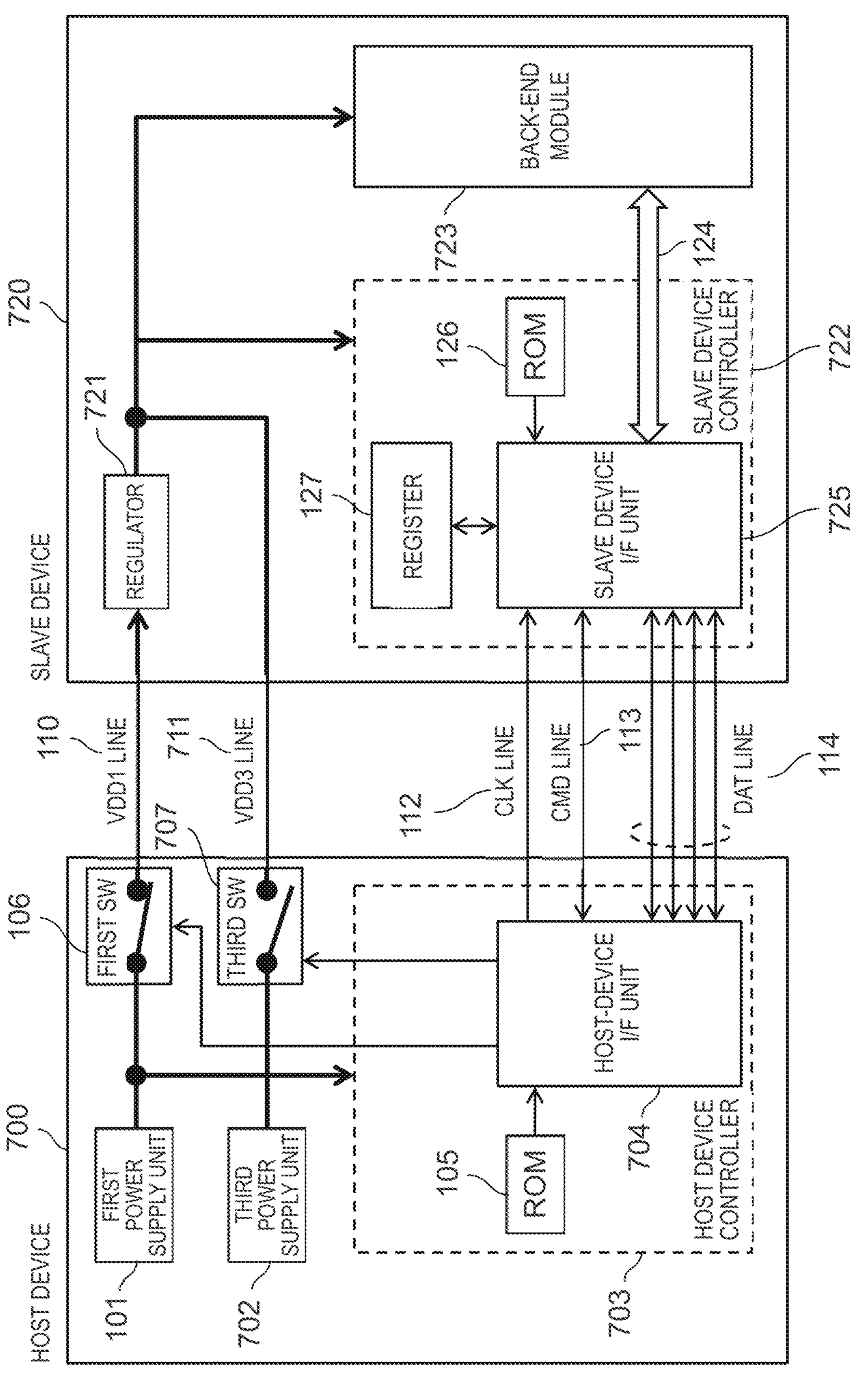
FIG. 7 is a block diagram illustrating a configuration of a host-slave system including a slave device and a host device according to a second exemplary embodiment.

FIG. 7 is a block diagram illustrating a slave device according to a second exemplary embodiment and a host-slave system including a host device that controls the slave device. The present exemplary embodiment is different from the first exemplary embodiment in that while the power supply and the signal voltage are each switched from 3.3 V to 1.8 V in the first exemplary embodiment, the power supply and the signal voltage are each switched from 3.3 V to 1.2 V in the present exemplary embodiment. Thus, a voltage value representing a high level is set to 3.3 V or 1.2 V in the present exemplary embodiment.

As illustrated in FIG. 7, host device 700 includes first power supply unit 101, third power supply unit 702 that supplies a power supply of 1.2 V, host device controller 703, first SW 106, and third SW 707 that switches whether to output the power supply supplied from third power supply unit 702 to the outside.

Host device 700 and slave device 720 are basically connected to each other as in the first exemplary embodiment, and are different from the first exemplary embodiment in that VDD3 line 711 is used instead of VDD2 line 111 to supply a power supply of 1.2 V.

Slave device 120 includes regulator 721 that steps down at least a power supply of 3.3 V to a power supply of 1.2 V, slave device controller 722, back-end module 723, and back-end bus 124 that performs data communication between slave device controller 722 and back-end module 723. Slave device controller 722 and back-end module 723 in the present exemplary embodiment are driven by the power supply of 1.2 V.

Figure 8:
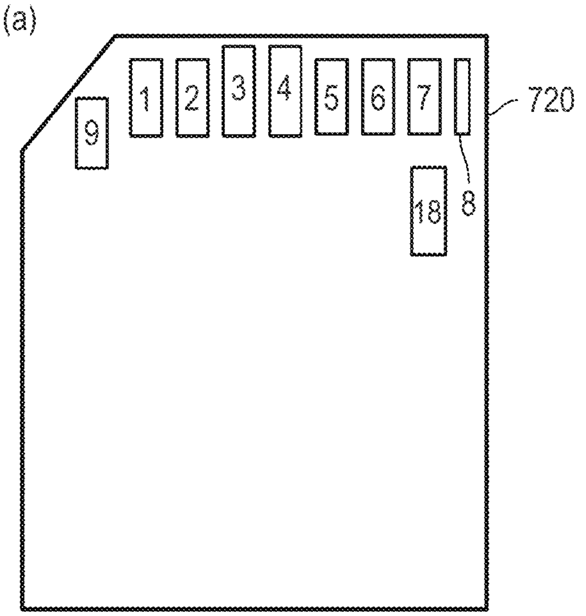
FIG. 8 is a diagram illustrating terminal placement of an SD card that is an example of the slave device according to the second exemplary embodiment.

FIG. 8 is a diagram illustrating terminal placement and terminal names of an SD card that is an example of the slave device according to the second exemplary embodiment. The SD card of the present exemplary embodiment illustrated in FIG. 8(*a*) includes a terminal for VDD3 (terminal number 18) instead of terminal number 14 illustrated in FIG. 2(*a*).

Figure 9:
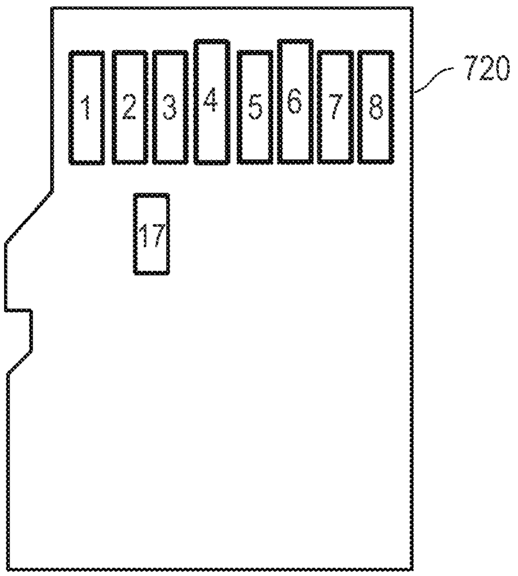
FIG. 9 is a diagram illustrating terminal placement of a microSD card that is an example of the slave device according to the second exemplary embodiment.

FIG. 9 is a diagram illustrating terminal placement and terminal names of a microSD card that is another example of the slave device according to the second exemplary embodiment. The microSD card of the present exemplary embodiment illustrated in FIG. 9(*a*) includes a terminal for VDD3 (terminal number 17) instead of terminal number 9 illustrated in FIG. 3(*a*).

Figure 10:
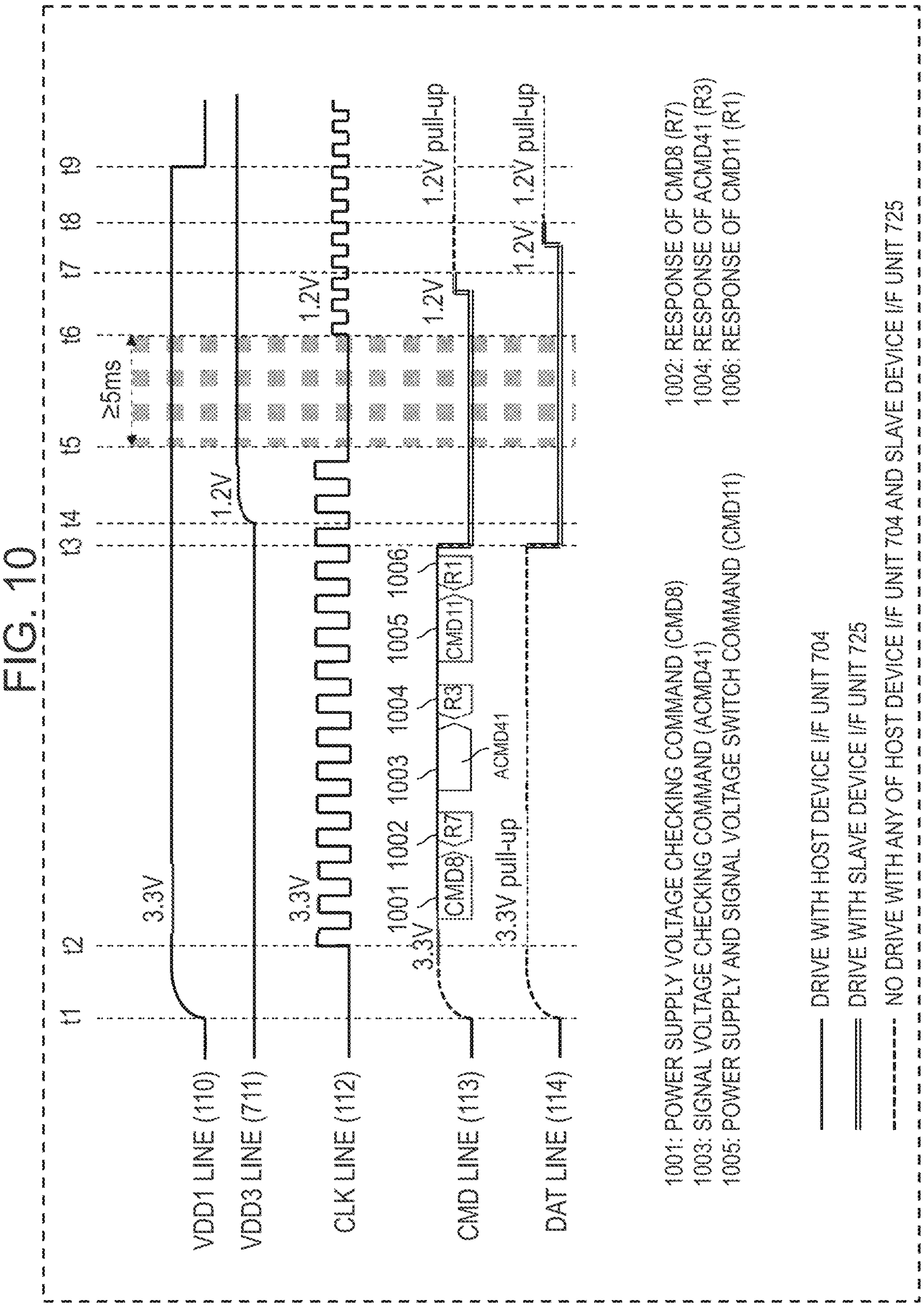
FIG. 10 is a timing chart illustrating an activation sequence of the host-slave system according to the second exemplary embodiment.
Figure 11:
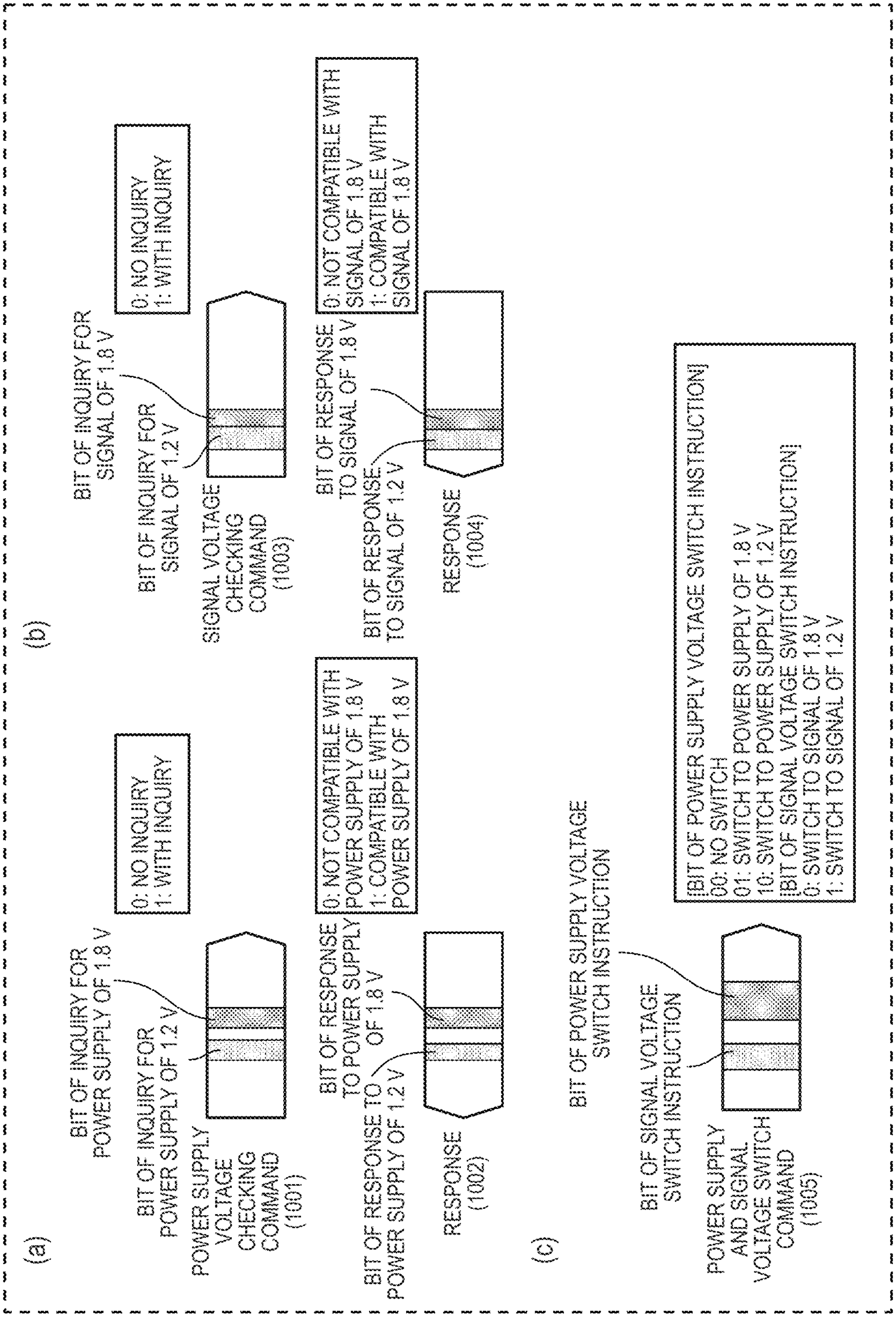
FIG. 11 is a diagram illustrating a power supply voltage checking command, a signal voltage checking command, a power supply and signal voltage switch command, and parameters incorporated in corresponding responses in the second exemplary embodiment.
Figure 12:
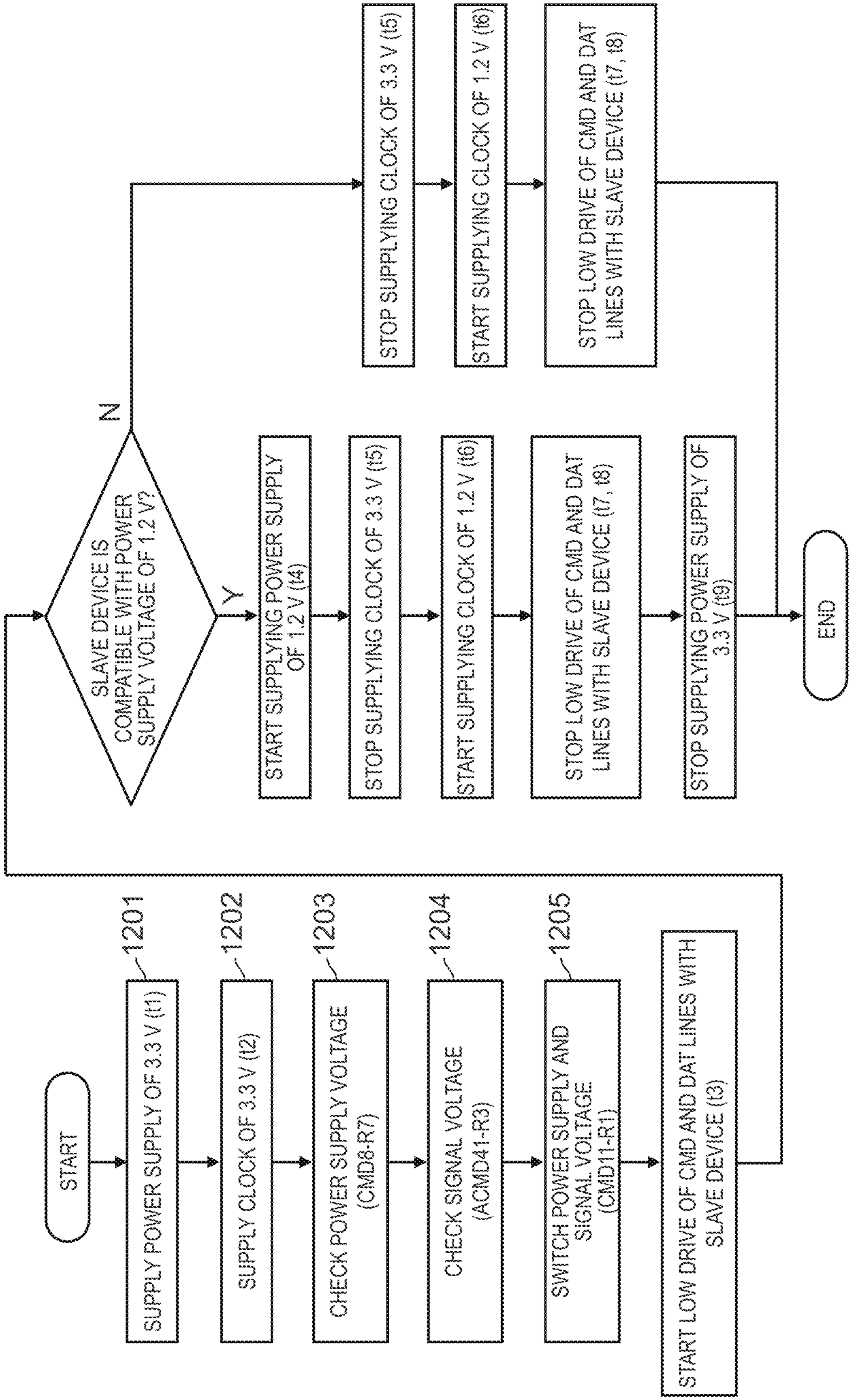
FIG. 12 is a flowchart of the activation sequence of the host-slave system according to the second exemplary embodiment.

FIG. 10 is a timing chart illustrating an activation sequence according to the second exemplary embodiment, FIG. 11 is a diagram illustrating configurations of a power supply voltage checking command and a response thereof, a signal voltage checking command and a response thereof, and a power supply and signal voltage switch command in the activation sequence of FIG. 10, and FIG. 12 is a flowchart according to the second exemplary embodiment.

Hereinafter, operation of the present exemplary embodiment will be described focusing on differences from the first exemplary embodiment with reference to FIGS. 7 to 12.

Similar to the first exemplary embodiment, first SW 106 and third SW 707 are turned off immediately after host device 700 is activated, so that the power supply of 3.3 V supplied by first power supply unit 101 and the power supply of 1.2 V supplied by third power supply unit 702 are not output to the outside of host device 700.

When host device I/F unit 704 instructs first SW 106 to be turned on, the power supply of 3.3 V is supplied to slave device 720 through VDD1 line 110 at time t1 in FIG. 10 (1201). At this time, slave device 720 receives supply of the power supply of 3.3 V from the terminal with terminal number 4 in FIG. 8 when the SD card is used, or from the terminal with terminal number 4 in FIG. 9 when the microSD card is used. The power supply of 3.3 V is stepped down to the power supply of 1.2 V by regulator 721 and then is supplied to slave device controller 722 and back-end module 723.

After supplying the clock of 3.3 V to slave device I/F unit 725 through CLK line 112 at time t2 (1202), host device I/F unit 704 transmits power supply voltage checking command 1001 (CMD8) to slave device I/F unit 725 through CMD line 113. Power supply voltage checking command 1001 in the present exemplary embodiment includes a bit of inquiry for the power supply of 1.2 V in addition to the bit of inquiry for the power supply of 1.8 V described in the first exemplary embodiment. In the present exemplary embodiment, "1" (with inquiry) is set to the bit of inquiry for the power supply of 1.2 V.

When "1" is set to the bit of inquiry for the power supply of 1.2 V, slave device I/F unit 725 having received power supply voltage checking command 1001 calls a bit "1" indicating compatibility with the power supply of 1.2 V from register 127, sets "1" to a bit of response to the power supply of 1.2 V of response 1002 (R7) illustrated in FIG. 11(*a*), and transmits the response to host device I/F unit 704 (1203).

When slave device 720 is not compatible with the power supply of 1.2 V or when a value of the bit of inquiry for the power supply of 1.2 V of power supply voltage checking command 1001 is "0", operation as in the first exemplary embodiment is performed.

After receiving response 1002, host device I/F unit 704 transmits signal voltage checking command 1003 (ACMD41) to slave device I/F unit 725. As illustrated in FIG. 11(*b*), the bit of inquiry for the signal of 1.8 V and a bit of inquiry for a signal of 1.2 V are multiplexed in signal voltage checking command 403, and "1" (with inquiry) is set to the bit of inquiry for the signal of 1.2 V in the present exemplary embodiment.

At this time, slave device I/F unit 725 sets "1" to a bit of response to the signal of 1.2 V of response 1004 (R3) illustrated in FIG. 5(*b*), and transmits the response to host device I/F unit 704 (1204).

When slave device 720 is not compatible with the signal of 1.2 V or when a value of bit of inquiry for the signal of 1.2 V of signal voltage checking command 1003 is "0", operation as in the first exemplary embodiment is performed.

After the series of checking operations, host device I/F unit 704 transmits power supply and signal voltage switch checking command 1005 (CMD11) to slave device I/F unit 725 through CMD line 113.

Power supply and signal voltage switch checking command 1005 of the present exemplary embodiment includes a bit of power supply voltage switch instruction including two bits and a bit of signal voltage switch instruction including one bit. To switch both the power supply and the signal to 1.2 V in the present exemplary embodiment, "10" (switch to the power supply of 1.2 V) is set as the bit of power supply voltage switch instruction, and "1" (conversion to the signal of 1.2 V) is set as the bit of signal voltage switch instruction. Unlike the bit of power supply voltage switch instruction, a value indicating "no switch" is not defined in the bit of signal voltage switch instruction. This is because power supply and signal voltage switch checking command 1005 (the same applies to power supply and signal voltage switch checking command 405) is a command issued for switch to the signal of 1.8 V in the conventional technique, and thus needs to maintain consistency with specifications of a conventional SD card. If power supply voltage is desired to be changed while signal voltage is maintained at 3.3 V, the bit of signal voltage switch instruction may be extended to define a value corresponding to "no signal voltage switch".

Slave device I/F unit 725 having received power supply and signal voltage switch checking command 1005 transmits response 1006 (R1) to host device I/F unit 704 through CMD line 113 (1205).

Subsequent operations are similar to those of the first exemplary embodiment except that host device 700 starts supply of the power supply of 1.2 V through VDD3 line 711 to cause signal voltage of each of CLK line 112, CMD line 113, and DAT line 114 to be 1.2 V after time t6 instead of allowing host device 100 to start supply of the power supply of 1.8 V through VDD2 line 111 in the first exemplary embodiment.

As described above, the present exemplary embodiment enables further reduction in power consumption as compared with the first exemplary embodiment by switching each of the power supply and the signal voltage to 1.2 V lower than 1.8 V.

Supplement

The SD card and the microSD card, which are each the slave device according to the present invention, are each supplied with the power supply of 3.3 V immediately after activation, and are each driven by a power supply with a lower voltage (1.8 V or 1.2 V) in response to a switch instruction from the host device. This is because the host device compatible with the conventional SD card and the microSD card can supply only the power supply of 3.3 V, and thus even when the slave device of the present invention is connected to a conventional host device, the slave device operates correctly to maintain compatibility.

In the present invention, the slave device I/F unit is driven by the power supply of 1.8 V supplied through VDD2 line 111 or the power supply of 1.2 V supplied through VDD3 line 711. The slave device I/F unit primarily needs to generate a signal of 3.3 V at least immediately after activation. Thus, instead of the above configuration, the power supply of 3.3 V supplied through VDD1 line 110 may be supplied to the slave device controller. This configuration may allow the slave device controller to include a regulator that steps down the power supply of 3.3 V to the power supply of 1.8 V or 1.2 V, and allow either or both of 3.3 V directly input to the slave device controller and 1.8 V or 1.2 V stepped down by the regulator to be used as the power supply depending on timing. This kind of configuration is desirable to increase minimum time from time t5 to time t6 in consideration of performing processing corresponding to each power supply island using the slave device controller.

Figure 13:
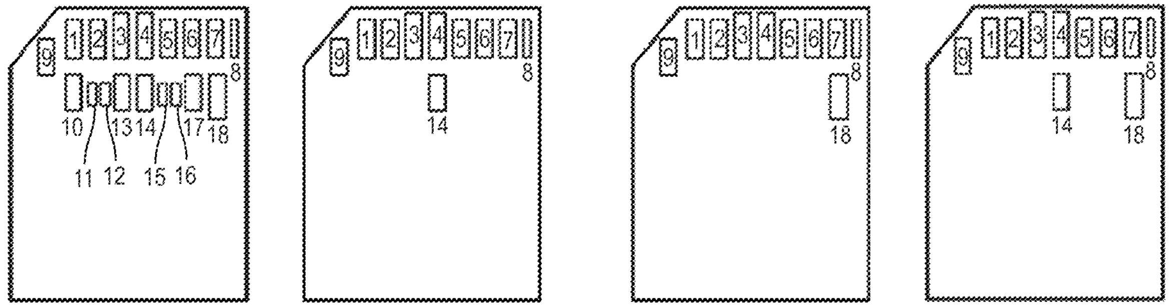
FIG. 13 is a diagram illustrating a relationship between an SD Express card and an SD card according to an exemplary embodiment of the present invention.

Examples of the SD card include an SD Express card that can communicate using a PCIe bus in addition to a conventional SD interface. FIG. 13(*a*) is a diagram illustrating terminal placement of the SD Express card. The SD Express card includes a terminal for VDD2 (terminal number 14) as the power supply of 1.8 V and a terminal for VDD3 (terminal number 18) as the power supply of 1.2 V in addition to a terminal for VDD1 (terminal number 4) as the power supply of 3.3 V. The terminal for VDD2 of the SD card (FIG. 13(*b*)) described in the first exemplary embodiment is identical to that of the SD Express card. Similarly, the terminal for VDD3 of the SD card (FIG. 13(*c*)) described in the second exemplary embodiment is identical to that of the SD Express card. Thus, a connector for the SD Express card can be directly used as a connector necessary for connection between the host device and the SD card in the exemplary embodiments of the present invention. This matter means that no new connector needs to be manufactured when the present invention is implemented, and thus being greatly advantageous in terms of development period and cost. The present invention also enables using an SD card that includes both the terminal for VDD2 and the terminal for VDD3 as illustrated in FIG. 13(*d*) and operates with either the power supply of 1.8 V or the power supply of 1.2 V. Even in this case, a connector for an SD Express card can be used.

Figure 14:
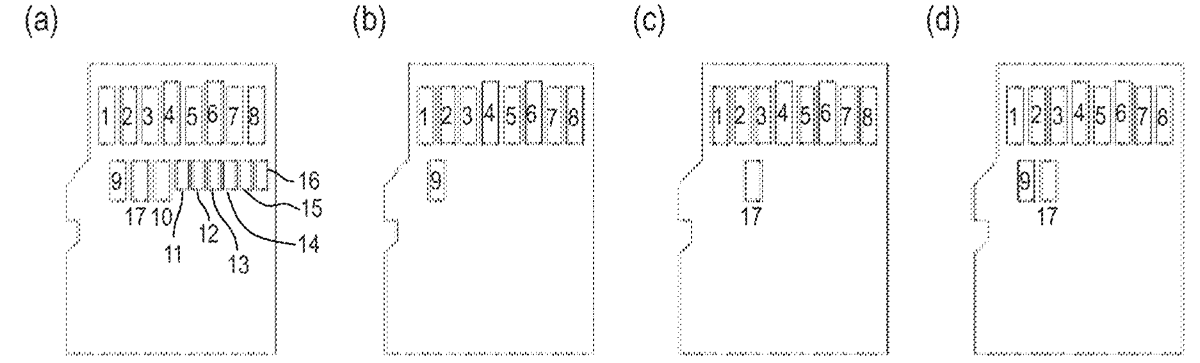
FIG. 14 is a diagram illustrating a relationship between a microSD Express card and a microSD card according to an exemplary embodiment of the present invention.

Similarly, even when the slave device of the present invention is a microSD card (FIGS. 14(*b*), 14(*c*), and 14(*d*)) as illustrated in FIG. 14, a connector for a microSD Express card compatible with the PCIe bus can be directly used, and thus labor for manufacturing a new connector can be saved.

The SD card or the microSD card of the present invention may be additionally provided with a VSS terminal at a position corresponding to a VSS (ground) terminal of the SD Express card or the microSD Express card. For the SD card, the terminals with terminal numbers 10, 13, and 17 are VSS terminals in the SD Express card as illustrated in FIGS. 13(*a*) and 13(*c*), so that one or more terminals corresponding to terminal numbers 10, 13, or 17 may be added to the SD card of the present invention (the parts (b), (c), and (d) in FIG. 13) as VSS terminals.

Similarly, for the microSD card, the terminals with terminal numbers 10, 13, and 16 are VSS terminals in the microSD Express card as illustrated in FIGS. 14(*a*) and 14(*c*), so that one or more terminals corresponding to terminal numbers 10, 13, or 16 may be added to the microSD card of the present invention (the parts (b), (c), and (d) in FIG. 14) as VSS terminals.

Although the slave device of the present invention has been described in which the back-end module is a flash memory, a wireless communication module for performing wireless communication with the outside, other than the flash memory, enables acquiring a similar effect. Examples of a slave device equipped with a wireless communication module as a back-end module include an SDIO card.

Although the power supply voltage check and the signal voltage check are performed by different commands in the present invention, these checks may be performed by one command.

Additionally, although the present invention has been described with power supply voltage equal to signal voltage after voltage switch (after t6 in FIG. 4 or 10), the power supply voltage and the signal voltage after the voltage switch may be different from each other, for example, 1.8 V and 1.2 V, respectively.

INDUSTRIAL APPLICABILITY

The present disclosure is applicable to a slave device including an SD card and a microSD card, a host device that controls the slave device, and a host-slave system including the host device and the slave device.

REFERENCE MARKS IN THE DRAWINGS

100 host device
101 first power supply unit
102 second power supply unit
103 host device controller
104 host device I/F unit
105 ROM
106 first SW
107 second SW
110 VDD1 line
111 VDD2 line
112 CLK line
113 CMD line
114 DAT line
120 slave device
121 regulator
122 slave device controller
123 back-end module
124 back-end bus
125 slave device I/F unit
126 ROM
127 register
401 power supply voltage checking command
402 response
403 signal voltage checking command
404 response
405 power supply and signal voltage switch checking command
406 response
700 host device
702 third power supply unit
703 host device controller
704 host device I/F unit
707 third SW
711 VDD3 line
720 slave device
721 regulator
722 slave device controller
723 back-end module
725 slave device I/F unit
1001 power supply voltage checking command
1002 response
1003 signal voltage checking command
1004 response
1005 power supply and signal voltage switch checking command
1006 response

The invention claimed is:

1. A host device connected to a slave device through at least a first power supply line, a second power supply line, and a plurality of signal lines, the host device being configured to:

supply power with a first voltage to the slave device through the first power supply line;

instruct the slave device through a signal line of the plurality of signal lines to check compatibility with a power input with a second voltage lower than the first voltage;

instruct the slave device on voltage switch through the signal line when the slave device is compatible with the power input with the second voltage;

supply power with the second voltage to the slave device through the second power supply line when a normal response is received from the slave device in response to the instruction for the voltage switch; and stop supplying the power with the first voltage to the slave device through the first power supply line after supplying the power with the second voltage to the slave device through the second power supply line.

2. The host device according to claim 1, wherein the host device transmits a command with a predetermined value to the slave device through the signal line in order to instruct the slave device to check compatibility with the power input with the second voltage and instruct the slave device on the voltage switch.

3. The host device according to claim 1, wherein the host device controls the signal line to a predetermined voltage level when receiving the normal response from the slave device to the instruction for the voltage switch.

4. The host device according to claim 3, wherein the predetermined voltage level is 0 V or a voltage near 0 V.

5. A slave device connected to a host device through at least a first power supply line, a second power supply line, and a plurality of signal lines, the slave device being configured to:

receive supply of power with a first voltage from the host device through the first power supply line;

respond to the host device through a signal line of the plurality of signal lines when the slave device receives an instruction to check compatibility with a power input with a second voltage lower than the first voltage from the host device through the signal line;

transmit a normal response to the host device through the signal line when an instruction for voltage switch is received from the host device through the signal line;

receive power with the second voltage from the host device through the second power supply line in response to the transmitting of the normal response; and stop receiving the power with the first voltage from the host device through the first power supply line after receiving the power with the second voltage from the host device through the second power supply line.

6. The slave device according to claim 5, wherein the slave device responds to the host device and transmits a response with a predetermined value to the host device through the signal line to transmit the normal response to the host device.

7. The slave device according to claim 5, wherein the signal line is controlled to a predetermined voltage level by the host device when the host device receives the normal response from the slave device to the instruction for the voltage switch.

8. The slave device according to claim 7, wherein the predetermined voltage level is 0 V or a voltage near 0 V.

9. A host-slave system comprising:

a host device; and a slave device connected to the host device through at least a first power supply line, a second power supply line, and a plurality of signal lines, wherein the host device supplies power with a first voltage to the slave device through the first power supply line;

the host device instructs the slave device through a signal line of the plurality of signal lines to check compatibility with a power input with a second voltage lower than the first voltage;

the slave device responds to the host device through the signal line when receiving an instruction to check compatibility with the power input with the second voltage;

the host device instructs the slave device on voltage switch through the signal line when the slave device is compatible with the power input with the second voltage;

the slave device transmits a normal response to the host device through the signal line when the voltage switch is instructed from the host device through the signal line;

the host device supplies power with the second voltage to the slave device through the second power supply line when receiving the normal response from the slave device; and the host device stops supplying the power with the first voltage to the slave device through the first power supply line after supplying the power with the second voltage to the slave device through the second power supply line.

10. The host-slave system according to claim 9, wherein the host device transmits a command with a predetermined value to the slave device through the signal line in order to instruct the slave device to check compatibility with the power input with the second voltage and instruct the slave device on the voltage switch, and the slave device responds to the host device and transmits a response with a predetermined value to the host device through the signal line to transmit the normal response to the host device.

11. The host-slave system according to claim 9, wherein the host device controls the signal line to a predetermined voltage level when receiving the normal response from the slave device to the instruction for the voltage switch.

12. The host-slave system according to claim 11, wherein the predetermined voltage level is 0 V or a voltage near 0 V.

* * * * *